United States Patent [19]
Di Matteo et al.

[11] 3,970,361
[45] July 20, 1976

[54] THREE-DIMENSIONAL DISPLAY SYSTEM

[75] Inventors: Paul L. Di Matteo, Huntington; Joseph A. Ross, Fort Salonga; Howard K. Stern, Greenlawn, all of N.Y.

[73] Assignee: Dynell Electronics Corporation, Melville, N.Y.

[22] Filed: Oct. 16, 1974

[21] Appl. No.: 515,146

[52] U.S. Cl. ............................... 350/144; 350/286
[51] Int. Cl.² ............................................ G02B 27/22
[58] Field of Search ........... 350/144, 190, 194, 204, 350/286; 352/116, 119, 120

[56] References Cited
UNITED STATES PATENTS

| | | | |
|---|---|---|---|
| 585,694 | 7/1897 | Orford | 350/286 X |
| 2,244,687 | 6/1941 | Goldsmith et al. | 350/144 X |
| 2,401,271 | 5/1946 | Pi Suner | 350/144 X |
| 3,371,155 | 2/1968 | Andersen | 350/144 X |

*Primary Examiner*—John K. Corbin
*Assistant Examiner*—Matthew W. Koren
*Attorney, Agent, or Firm*—Max Fogiel

[57] ABSTRACT

A display arrangement in which a viewer experiences the effect of depth in conjunction with a two-dimensional display. Varying depth effects are applied to the two-dimensional display by moving rapidly transparent elements of varying thickness transversely to the direction of vision of the viewer. The transparent elements are held and mounted in a rotating disc in the form of segments, and the disc with the transparent segments is rotated rapidly in front of the two-dimensional display.

17 Claims, 10 Drawing Figures

FIG. 1

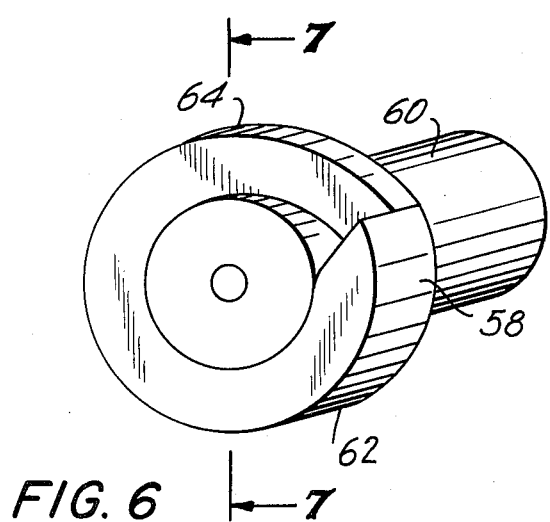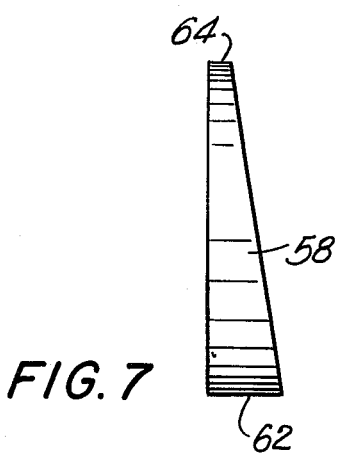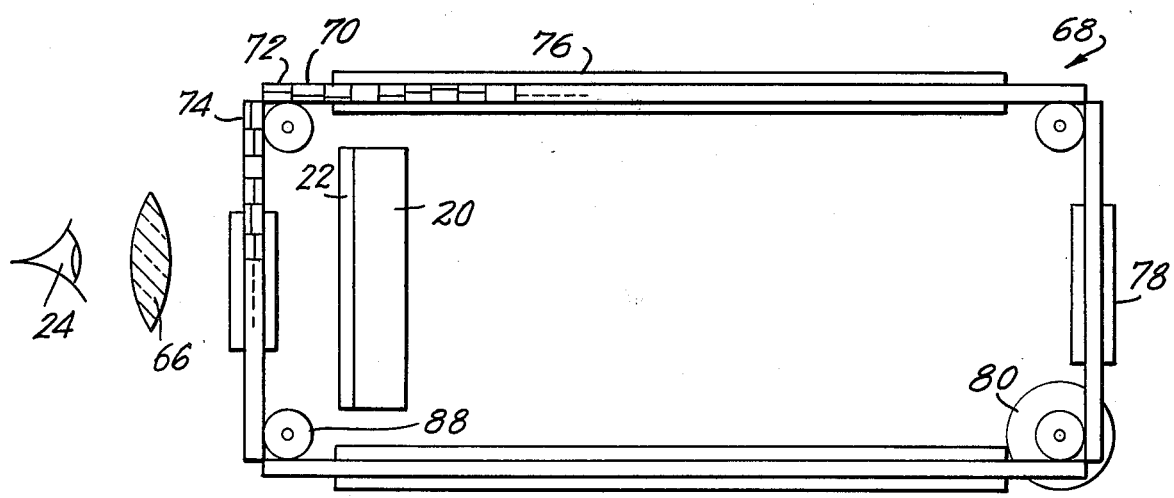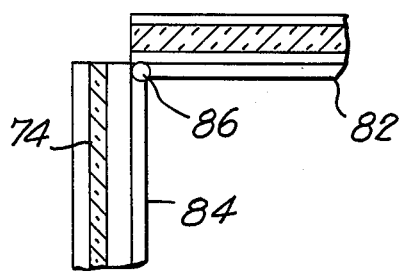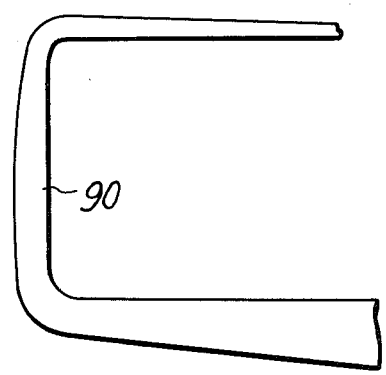

THREE-DIMENSIONAL DISPLAY SYSTEM

BACKGROUND OF THE INVENTION

In viewing information displayed on a two-dimensional screen as obtainable with a cathode-ray tube, for example, it is often desirable to apply the effect of depth to the image displayed, for the purpose of providing the viewer with a more realistic representation. The effect of depth in conjunction with a two-dimensional display is also found generally to be more pleasant to viewers.

Whereas devices with two-dimensional displays in conjunction with depth have been known in the art, such devices have been complex in design and construction, and have not been feasible to fabricate and use for commercial purposes. Such devices in the past, furthermore, did not provide the effects of depth in a manner which was found realistic and convincing by the viewer.

Accordingly, it is an object of the present invention to provide an arrangement which is operated in conjunction with a two-dimensional display so as to impart the effect of depth to the image observed by the viewer.

Another object of the present invention is to provide an arrangement of the foregoing character which is simple in design and construction, and provides the effects of depth in a realistic and convincing manner to the viewer.

A further object of the present invention is to provide a three-dimensional display system which has a substantially long operating life.

A still further object of the present invention is to provide an arrangement, as described, which requires substantially little maintenance in operation.

SUMMARY OF THE INVENTION

The objects of the present invention are achieved by providing an arrangement in which a plurality of transparent elements are rapidly moved between a two-dimensional display and a viewer. The transparent elements are mounted in a disc-shaped frame and rotated rapidly in front of the viewer, and transversely to the direction of vision of the viewer.

The transparent elements may be separately-mounted elements in the disc-shaped frame, or they may be integrally formed from a disc made of transparent material. The transparent elements in another embodiment, may also be transported in a conveyor type of arrangement and moved past the two-dimensional display.

In a further embodiment, a transparent helically-shaped member is mounted on a cylindrical surface or disc rotated transversely to the direction of vision of the viewer to provide the effect of depth in conjunction with the two-dimensional display system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 6 is a perspective view and shows a further embodiment in which a helically-shaped transparent member is mounted on a cylindrical surface rotated in front of the viewer;

FIG. 7 is a side view taken along line 7—7 in FIG. 6;

FIG. 8 is a plan view and shows a further embodiment for arranging the movement of transparent elements of varying thicknesses between a viewer and a two-dimensional display;

FIG. 9 is a partial plan view and shows the construction of the frame for holding the transparent elements in the arrangement of FIG. 8; and FIG. 10 is a partial plan view of a transparent member of varying thickness along the length of the member and transportable between the viewer and the display in accordance with the arrangement of FIG. 8.

DESCRIPTION OF THE PREFERRED EMBODIMENTS

Figure 1:
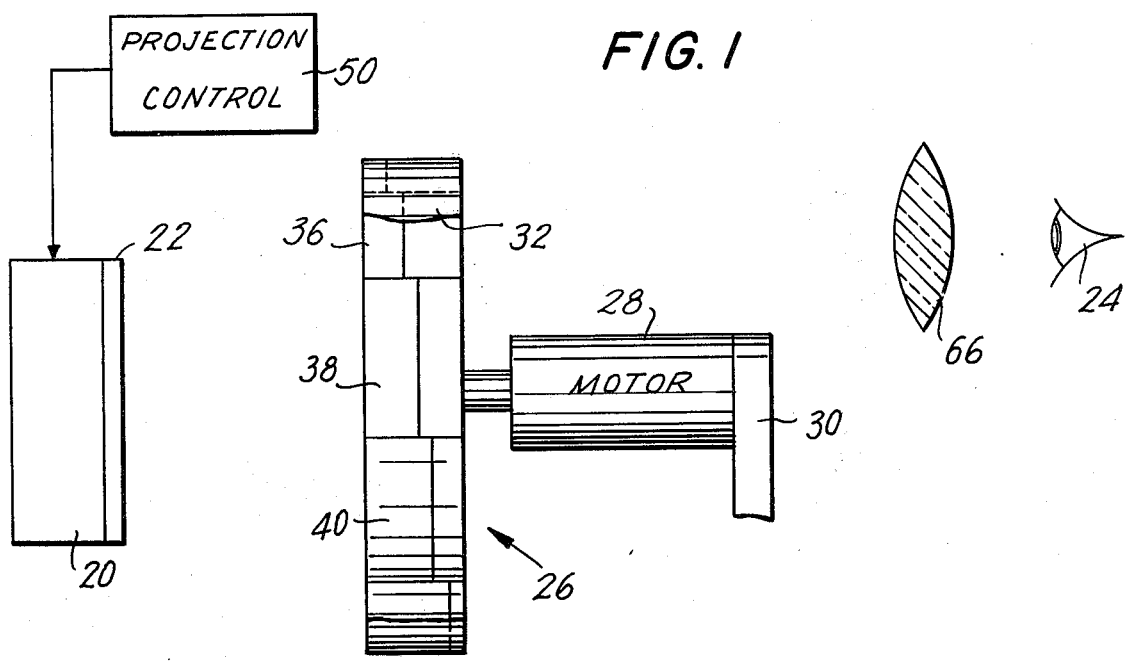
FIG. 1 is a schematic view of the three-dimensional display system, in accordance with the present invention.

Referring to the drawing and in particular to FIG. 1, there is shown a display unit 20 having a screen 22 on which information, pictorial views, photography and the like are displayed in two-dimensional form. The display unit 20 may be comprised of, for example, a commonly known cathode-ray tube.

Located between the display screen 22 and a viewer 24, is a rotary assembly generally indicated by reference numeral 26. The rotary assembly 26 is driven by a motor 28 mounted on a motor frame 30.

The rotary assembly 26 has a disc-shaped frame comprised of a rim member 32 and a hub portion 34. Mounted in the disc-shaped frame of the rotary assembly 26, are elements or segments 36, 38, 40, for example. These elements or segments are made of transparent material, and each element has a thickness differing from the thickness of its adjacent neighboring elements. Thus, element 38 has a thickness which is different from elements 36 and 40, for example. The arrangement of the elements with the varying thicknesses may be seen from FIG. 1, in which the rim member 32 is partially broken away, for purposes of clarity. The rim member 32 may be connected to the hub 34 by means of substantially thin spokes 42 disposed between the segments or elements. The transparent elements, furthermore, abut each other closely or the spokes 42. Thus, substantially little space prevails between adjacent segments or elements when mounted in place about the hub 34.

Each of the elements such as 38, for example, has the shape of a segment with a peripheral curved surface 44 in contact with the rim 32, and an internal curved surface 46 in contact with the hub 34. The profile of the surfaces 44 and 46 comprises portions of circles.

With the rotary assembly 26 within the path of vision of the viewer 24, light originating from the display screen 22, for example, becomes refracted by the transparent elements in the assembly 26, before reaching the eye of the viewer 24. The refraction of light in passing from one medium into another, is an established physical principle and well known in the art. In view of the different thicknesses of the elements 36, 38, 40, for example, light passing through these elements of different thicknesses will be refracted differently or by different amounts. As a result of the differences in refraction, light originating from a point on the screen 22 causes the point to appear at different depths, when viewed through the different elements. Accordingly, by rotating the assembly of elements 26 in front of the screen 22, light originating from the screen 22 will be refracted by different amounts by the elements, as they are moved past the screen.

By multiplexing or advancing the display at predetermined instants in relation to the rotation of the assembly 26, a predetermined depth may be presented to the viewer 24, as a result of having a predetermined element with a particular thickness located in the path of vision in front of the viewer. Accordingly, predetermined pictures and portions thereof may be associated with predetermined depths to the viewer 24 by controlling the switching or multiplexing of the display by the control unit 50, so that a particular frame for view appears on the screen 22, when a respective element is located in the path of vision of the viewer 24. By driving the assembly 26 with a synchronous motor 28, for example, the control unit 50 can readily switch or multiplex the display with respect to the motion of the assembly 26.

The switching or multiplexing of the display may be accomplished in various ways well known in the art as, for example, by a commutating device mounted on the shaft of the motor 28. The commutating device then furnishes signals corresponging to the rotation of the assembly 26, for switching the display in correspondence to such rotation.

Figure 4:
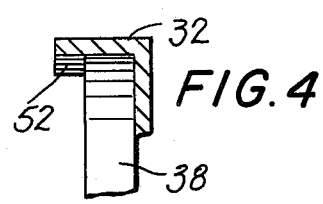
FIG. 4 is a partial sectional view and shows the construction for holding the transparent segments of varying thicknesses within the disc-shaped frame of FIG. 2.

In mounting the element 38 within the assembly 26, for example, the element 38 is inserted into the rim 32 which covers the peripheral edge 44 of the element, and overlaps a portion of the side of the element. A spacer 52 is then attached to the rim 32 and holds the element 38 securely against the angled portion of the rim 32. For each different element with different thickness, a differently dimensioned spacer 52 is provided to accommodate the different thickness. Thus, spacer 52, in FIG. 4 would be longer if element 38 were, for example, thinner in that Figure.

Figure 2:
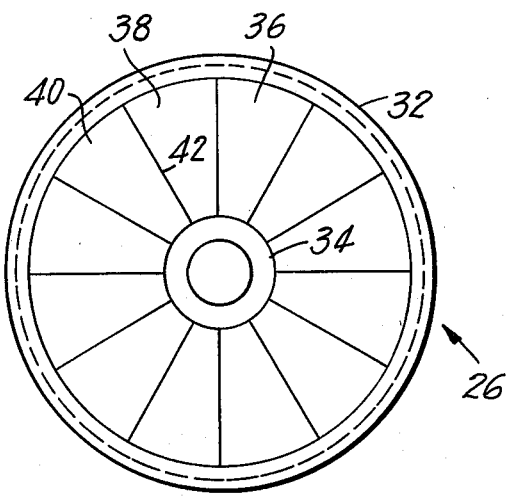
FIG. 2 is a plan view of a rotating disc-shaped frame holding transparent segments of varying thickness and used in the system of FIG. 1.
Figure 3:
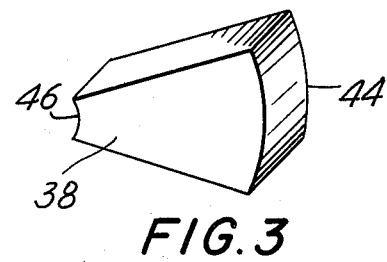
FIG. 3 is a perspective view of a transparent segment held in the disc-shaped frame of FIG. 2.
Figure 5:
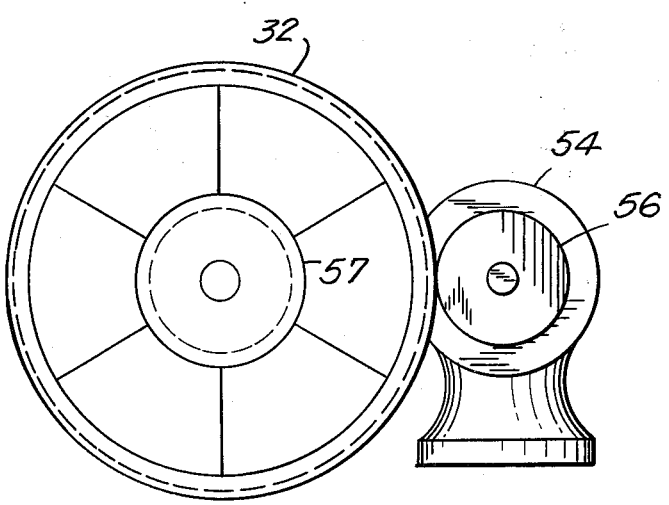
FIG. 5 is a plan view and shows another embodiment for driving the rotating disc-shaped frame of FIG. 2.

In lieu of driving the assembly 26 at its center with hub 34, it is also possible to provide a rotary drive in which a motor 54 is connected to the peripheral surface of the rim 32, by means of a driving disc or pinion 56. The drive between the disc or pinion and periphery of the rim 36, may constitute a frictional drive or a geared drive. Furthermore, as shown in FIG. 5, the elements of different thicknesses in the rotary assembly, may have a substantially shorter dimension along a diameter of the assembly, in contrast to the configuration shown in FIG. 2. Thus, in accordance with the arrangement of FIG. 5, the hub diameter 57 is substantially larger than that of hub 34. By providing a wheel or rotary assembly sufficiently large in diameter, in this manner, the elements may be made to approximate a rectangular shape.

It is not essential that the elements 36, 38, 40 with respective different thicknesses, be comprised of separate members mounted adjacently within the frame of the assembly 26 and spaced from each other by spokes 42. Instead, it is possible to provide a transparent disc which is of one-piece construction and which has the different elements of different thicknesses milled thereinto. In this manner, the assembly 26 may be made of integral construction, and, the rim and spoke members may be omitted.

In another embodiment, in accordance with the present invention, the varying thickness of a transparent member for providing different amounts of light refraction, is provided by a helically-shaped transparent member 58 mounted on a shaft or cylindrical rotating surface 60. The helical shape of the member 58 provides the varying thickness of transparent material in relation to the rotary motion of the shaft 60, so as to result in the varying depth effects observed by the viewer 24. Thus, in a side view of the helical member 58, as shown in FIG. 7, there is a transition from a wider or thicker portion 62 to a thinner portion 64.

It is to be noted in accordance with the present invention, that it is not essential for the elements in the assembly 26 to vary in thickness throughout the entire revolution of the assembly. Thus, a multiplicity or plurality of elements may each have different thickness over 90° of the assembly 26. This same arrangement of different thicknesses, then may be repeated over the next 90°, for example. Thus, the assembly 26 may in such an arrangement, have four portions or sections of elements in which each portion or cycle has elements of varying thicknesses which are repeated in the neighboring portions or sections.

For purposes of magnifying the image seen by the viewer 24, it is also possible to locate a magnifying lens 66 or similar optical device within the path of vision of the viewer.

In another embodiment of the present invention and shown in FIG. 8, the elements of transparent element and of varying thicknesses, are mounted adjacently within a conveyor type of arrangement generally indicated by 68. The elements 70, 72, 74, for example, are rectangular shaped and guided along a rectangular-directed path by side frame guides 76 and end frame guides 78. The elements are moved along the rectangular path by means of a motor drive 80.

The elements 72 and 74, for example, are mounted in a frame 82 which is as wide as the element itself. Each such section 82 which holds an element, is hinged to the neighboring section 84 holding, for example, the element 74. A hinge 86 connects the two sections 82 and 84. The frame members 82 and 84 are channel-shaped members which seat the elements 74 and 72 and overlap only small portions of the lower sides of the transparent elements 72 and 74. The configuration of FIG. 9 illustrates when the elements 72 and 74 are moving around a corner of the rectangular path. When not moving around a corner, the frame members 82 and 84 are colinear, and the elements are coplanar, as demonstrated by the positioning of the elements 70 and 72 in FIG. 8, for example. For purposes of reinforcement, a duplicate set of mounting frames 82 and 84 may be applied over the top edges of the elements, so as to hold the elements in place adjacent to each other in a secure manner. With the elements 82 and 84 overlapping only substantially small portions of the bottom and top sides of the elements, the main area of the elements through which light is directed, is not obscured.

As each of the elements with varying thickness is moved in front of the display screen 22, the viewer 24 will perceive varying depths of the image displayed. Multiplexing and switching of the display may be accomplished by the unit 50, similarly to that described above in relation to FIG. 1. Furthermore, a magnifying lens or similar magnifying optical system 66 may be located in front of the viewer 24. The assembly of elements may be guided, furthermore, by auxiliary rollers 88 placed at the corners of the rectangular path. The drive between the motor 80 and the assembly of elements in FIG. 8 may constitute a frictional drive or a geared drive.

For the configuration of FIG. 8, moreover, it is not essential that separate transparent elements 70, 72, 74 be provided and held within a frame structure 82, 84, 86. Instead, the varying thickness for varying refraction may be provided by a continuous transparent member 90 which is shaped to have varying thickness along its length, as shown in FIG. 10. When made of plastic material, for example, the member 90 may then be sufficiently flexible to be moved around the corners of the rectangular path shown in FIG. 8.

The need for a display which is multiplexed with respect to time by the control unit 50 may, for example be avoided by resorting to a color-multiplexed system. In such an arrangement, each of the segments or elements is assigned a different color, so that different depths would be assigned to the colors red, blue, and green, for example, as they exist on a standard color TV-tube. A filter passing only red is used to cover one element or segment, a filter passing only green covers another segment, and a blue filter is positioned over the last segment. With this arrangement, then, the three different color images will appear at different depths to the viewer, when the disc or rotational assembly is moved rapidly.

In operating the rotary assembly 26 or rectilinear assembly 68, for example, it is essential that the elements or segments be moved rapidly, in order to eliminate flicker and to assure that the viewer will observe a smooth transition in light passing from one element to another.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A three-dimensional display arrangement comprising, in combination, a display screen for displaying an image thereon; transparent means of varying thickness movable continuously at substantially high speed past said display screen along a predetermined path, said transparent means having varying thickness along said path for varying the refraction of light from said display screen so that the image displayed on the screen will appear at varying depths to a viewer; means for moving said transparent means continuously past said display screen at a speed exceeding a predetermined magnitude related to the visual persistence of the human eye so that said viewer observing said image displayed on the screen perceives said image to be in motion on the screen due to varying the refraction of light from said screen by movement of said transparent means, the perception of said viewer that said image is in motion being dependent on moving said transparent means continuously at relatively high speed, the optical path between said display screen and said viewer being free of reflections, said light from said display screen passing unfocused through said transparent means, said viewer perceiving said image to be in motion only by the refraction of said light from said display screen, the refracted light being substantially free of reflections.

2. The display arrangement as defined in claim 1, including means for multiplexing the display in relation to the movement of said transparent means.

3. The display arrangement as defined in claim 1 wherein said transparent means comprises a rotary member having a plurality of transparent elements of varying thicknesses.

4. The display arrangement as defined in claim 3 wherein said rotary member comprises a hub member; a peripheral rim member; and means for connecting said peripheral rim to said hub member, said transparent elements being spaced about said hub member and held by said peripheral rim.

5. The display arrangement as defined in claim 4 including drive means connected to said hub member for driving said elements rotationally.

6. The display arrangement as defined in claim 4, including drive means connected to said peripheral rim for driving said peripheral rim and transparent elements rotationally.

7. The display arrangement as defined in claim 1 wherein said transparent means comprises a disc-shaped member varying in thickness with it angular position.

8. The display arrangement as defined in claim 7 wherein said disc-shaped member comprises an integral member having a plurality of stepped portions with varying thickness.

9. The display arrangement as defined in claim 1 wherein said transparent means comprises a helically-shaped transparent member.

10. The display arrangement as defined in claim 1 including image magnifying means between said transparent means and said viewer.

11. The display arrangement as defined in claim 1 wherein said transparent means has color filtering means for transmitting light of predetermined colors.

12. A three-dimensional display arrangement comprising, in combination, a display screen for displaying an image thereon; transparent means of varying thickness movable continuously at substantially high speed past said display screen along a predetermined path, said transparent means having varying thickness along said path for varying the refraction of light from said display screen so that the image displayed on the screen will appear at varying depths to a viewer; means for moving said transparent means continuously past said display screen at a speed exceeding a predetermined magnitude related to the visual persistence of the human eye so that said viewer observing said image displayed on the screen perceives said image to be in motion on the screen due to varying the refraction of light from said screen by movement of said transparent means, the perception of said viewer that said image is in motion being dependent on moving said transparent means continuously at relatively high speed, said transparent means comprising conveyor means movable along a substantially rectangularly-shaped path.

13. The display arrangement as defined in claim 12, wherein said transparent means comprises further a plurality of substantially rectangular-shaped transparent elements of varying thicknesses and movable along said rectangular-shaped path in side-by-side relationship.

14. The display arrangement as defined in claim 13 including frame means for holding said transparent elements, said frame means comprising a plurality of hinged frame portions, each frame portion holding substantially one transparent element.

15. A three-dimensional display arrangement comprising, in combination, a display screen for displaying an image thereon; transparent means of varying thickness movable continuously at substantially high speed past said display screen along a predetermined path, said transparent means having varying thickness along said path for varying the refraction of light from said display screen so that the image displayed on the screen will appear at varying depths to a viewer; said transparent means being movable continuously past said display screen at a speed exceeding a predetermined magnitude related to the visual persistence of the human eye so that said viewer observing said image displayed on the screen perceives said image to be in motion on the screen due to varying the refraction of light from said screen by movement of said transparent means, the perception of said viewer that said image is in motion being dependent on moving said transparent means continuously at relatively high speed; means for multiplexing the display in relation to the movement of said transparent means, said transparent means comprising a rotary member having a plurality of transparent elements of varying thicknesses; said rotary member comprising a hub member, a peripheral rim member, means for connecting said peripheral rim to said hub member, said transparent elements being spaced about said hub member and held by said peripheral rim; drive means connected to said peripheral rim for driving said peripheral rim and transparent elements rotationally; and color filtering means on said transparent means for transmitting light of predetermined colors, the optical path between said display screen and said viewer being free of reflections, said light from said display screen passing unfocused through said transparent means, said viewer perceiving said image to be in motion only by the refraction of said light from said display screen, the refracted light being substantially free of reflections.

16. A three-dimensional display arrangement comprising, in combination, a display screen for displaying an image thereon; transparent means of varying thickness movable continuously at substantially high speed past said display screen along a predetermined path, said transparent means having varying thickness along said path for varying the refraction of light from said display screen so that the image displayed on the screen will appear at varying depths to a viewer; said transparent means being movable continuously past said display screen at a speed exceeding a predetermined magnitude related to the visual persistence of the human eye so that said viewer observing said image displayed on the screen perceives said image to be in motion on the screen due to varying the refraction of light from said screen by movement of said transparent means, the perception of said viewer that said image is in motion being dependent on moving said transparent means continuously at relatively high speed; said transparent means comprising conveyor means movable along a substantially rectangular-shaped path and having a plurality of substantially rectangular-shaped transparent elements of varying thicknesses, said transparent elements being movable along said rectangular-shaped path in side-by-side relationship; image magnifying means between said transparent means and said viewer; frame means for holding said transparent elements, said frame means comprising a plurality of hinged frame portions, each frame portion holding substantially one transparent element, said display screen being located within said rectangular-shaped path and said viewer being located on the outside of said rectangular-shaped path; said transparent means having color filtering means for transmitting light of predetermined colors.

17. A three-dimensional display arrangement comprising, in combination, a display screen for displaying an image thereon; transparent means of varying thickness movable continuously at substantially high speed past said display screen along a predetermined path, said transparent means having varying thickness along said path for varying the refraction of light from said display screen so that the image displayed on the screen will appear at varying depths to a viewer; means for moving said transparent means continuously past said display screen at a speed exceeding a predetermined magnitude related to the visual persistence of the human eye so that said viewer observing said image displayed on the screen perceives said image to be in motion on the screen due to varying the refraction of light from said screen by movement of said transparent means, the perception of said viewer that said image is in motion being dependent on moving said transparent means continuously at relatively high speed; said transparent means comprising a closed loop-shaped flexible member movable along a substantially rectangular-shaped path and having a varying thickness along said path.

* * * * *